United States Patent
Böhm et al.

(10) Patent No.: US 6,415,650 B1
(45) Date of Patent: Jul. 9, 2002

(54) METHOD FOR OPERATING HELIUM LEAK INDICATOR AND THE APPLICATION OF THIS METHOD TO HELIUM LEAK INDICATORS

(75) Inventors: Thomas Böhm; Rudi Widt, both of Köln (DE)

(73) Assignee: Leybold Vakuum GmbH (DE)

( * ) Notice: Subject to any disclaimer, the term of this patent is extended or adjusted under 35 U.S.C. 154(b) by 0 days.

(21) Appl. No.: 09/463,245
(22) PCT Filed: Jun. 5, 1998
(86) PCT No.: PCT/EP98/03363
§ 371 (c)(1),
(2), (4) Date: Jan. 21, 2000
(87) PCT Pub. No.: WO99/09387
PCT Pub. Date: Feb. 25, 1999

(30) Foreign Application Priority Data

Aug. 14, 1997 (DE) .......................................... 197 35 250

(51) Int. Cl.⁷ ........................ G01M 03/20; G01M 03/02
(52) U.S. Cl. ............................ 73/40.7; 73/40; 340/605
(58) Field of Search ............. 73/40.7, 40; 340/605–606

(56) References Cited

U.S. PATENT DOCUMENTS

| 4,510,792 A | 4/1985 | Morel et al. .................. 73/40.7 |
| 4,779,449 A | 10/1988 | Bley et al. .................... 73/40.7 |
| 4,893,497 A | * 1/1990 | Danielson .................... 73/40.7 |
| 4,983,829 A | * 1/1991 | Bürger ........................ 250/282 |
| 5,537,857 A | * 7/1996 | Grosse Bley ................ 73/40.7 |
| 5,561,240 A | 10/1996 | Ochiai et al. ................ 73/40.7 |
| 5,585,548 A | * 12/1996 | Grosse Bley et al. ........ 73/40.7 |
| 5,625,141 A | * 4/1997 | Mahoney et al. ............ 73/40.7 |
| 5,703,281 A | * 12/1997 | Myneni ....................... 73/40.7 |
| 5,821,404 A | 10/1998 | Bohm et al. ................. 73/40.7 |
| 5,900,537 A | 5/1999 | Bohm et al. ................. 73/40.7 |
| 5,907,092 A | * 5/1999 | Bohm ......................... 73/40.7 |
| 6,021,663 A | * 2/2000 | Bohm ......................... 73/40.7 |
| 6,119,507 A | * 9/2000 | Flosbach et al. ............ 73/40.7 |

FOREIGN PATENT DOCUMENTS

| DE | 91 05 473.7 | 8/1991 |
| EP | 0 584 584 | 7/1993 |

* cited by examiner

Primary Examiner—Hezron Williams
Assistant Examiner—David J. Wiggins
(74) Attorney, Agent, or Firm—Wall Marjama & Bilinski LLP

(57) ABSTRACT

Method for operating, a helium leak indicator (1) consisting of a helium detector (4) with evacuation devices comprising at least a high-vacuum pump (6), a backing pump (9) and a valve (16) whose level of flow conductance can be adjusted and serves to modulate the through-flow of test gas to be analyzed; in order to influence the sensitivity in a simple manner, the method provides that the modulation properties be changeable in such a manner that the effective pumping capacity at the inlet of the leak indicator is changed by the adjustment of the modulation properties.

15 Claims, 2 Drawing Sheets

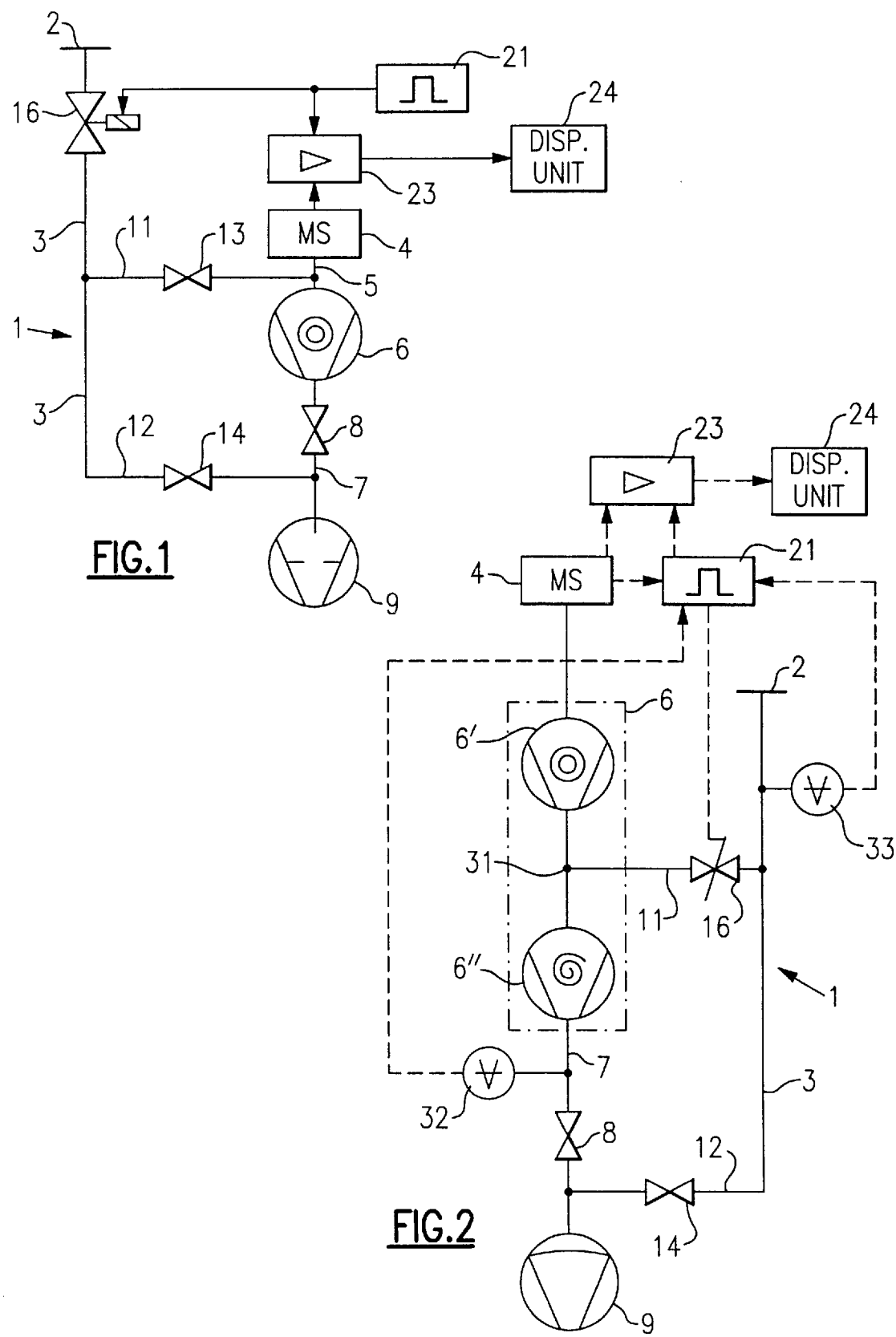

FIG.3
FIG.4
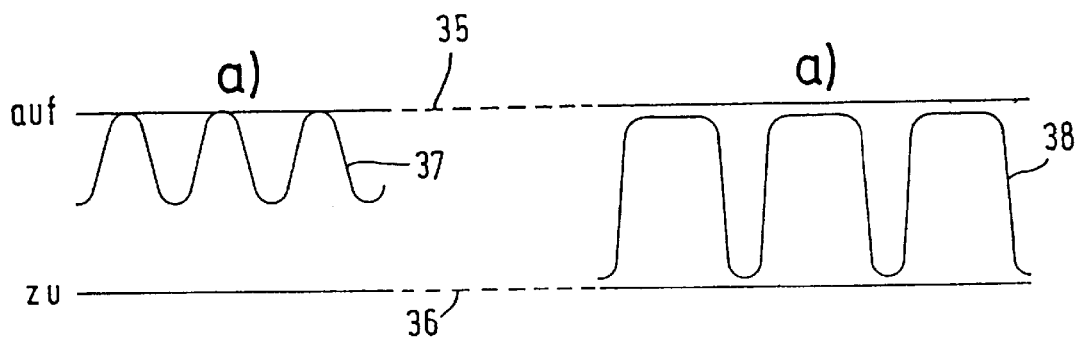
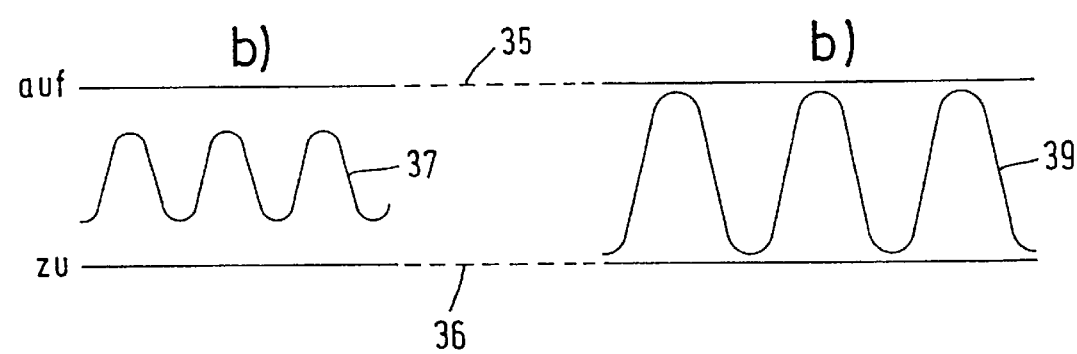
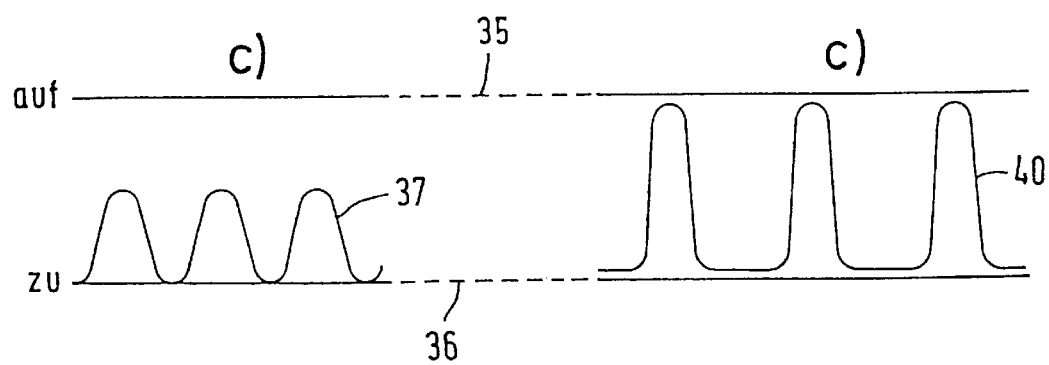

METHOD FOR OPERATING HELIUM LEAK INDICATOR AND THE APPLICATION OF THIS METHOD TO HELIUM LEAK INDICATORS

BACKGROUND OF THE INVENTION

The present invention relates to a method for operating a helium leak indicator having the characteristics of patent claim 1. Moreover, the present invention relates to a helium leak indicator suited for the implementation of this method.

During helium leak searching, the detection limit may be improved by reducing the pumping capacity of the vacuum pumps. For the purpose of reducing the pumping capacity it is known to use constrictions which may be switched on, or to disconnect the backing pump. In both instances the pumping capacity is reduced by increments and with a likewise increase in sensitivity. The price to pay for such an increase in sensitivity are longer measurement times, since these increase when reducing the pumping capacity of the vacuum pumps.

SUMMARY OF THE INVENTION

It is the task of the present invention to simplify, within the scope of a method for operating a helium leak indicator of the kind affected here, the way in which the pumping capacity is influenced and thus the way in which the detection limit of the leak measurements is attained, in order to perform high sensitivity measurements within an optimally short time. Moreover, an infinitely variable modification of the detection limit shall become possible.

According to the present invention these targets are attained through the characteristic features of the patent claims.

The present invention allows, through a modification of the modulation properties of the gas flow in which the presence of the test gas is to be detected, to influence the effective pumping capacity of the vacuum pumps, and thus the sensitivity of the leak search. Thus it becomes possible to the user to adapt the detection limit to the particular application in each case by setting up certain modulation properties. This adaptation allows the use of optimally short measurement times in each case. Since according to the present invention the pumping capacity is influenced with the aid of an inlet valve which can be modulated, any special measures for modifying the pumping capacity at the vacuum pumps themselves are no longer required.

An expedient operating method which has become possible through the present invention is, that the detection limit may be modified automatically down to a lower limit while the leak measurement is in progress. As the manipulated variable the signal supplied by the mass spectrometer may be employed, the magnitude of which depends, in the case of a not yet registered leak, on the helium background in the gas flow which is to be analysed, and which reduces in magnitude with increasing measurement time. As long as the signal magnitude does not drop below a given level, the modulation properties are not modified, and a relatively high pumping capacity is maintained. As soon as the magnitude of the signal drops below a given threshold, the pumping capacity is reduced by modifying the modulation properties and thus sensitivity is increased. Each leak determined and measured in this manner may therefore be determined within an optimally short measurement time.

DESCRIPTION OF THE DRAWINGS

Further advantages and details of the present invention shall be explained with reference to drawing FIGS. 1 to 4. Depicted in drawing FIGS. 1 and 2 are schematically represented design examples for a helium leak indicator according to the present invention and drawing FIGS. 3 and 4 are diagrams explaining the modulation properties.

DESCRIPTION OF THE INVENTION

In the helium leak indicator 1 according to drawing FIG. 1 the inlet is designated as 2, the line connected to inlet 2 as 3, and the test gas detector designed as a mass spectrometer as 4. High vacuum pump 6 (preferably a turbomolecular pump) is connected via line 5 to the inlet of the mass spectrometer 4. Connected to the discharge of the high vacuum pump 6 is line 7 with valve 8, said line being connected to the inlet of the backing pump 9. Connected to line 3 are line sections 11, 12 with valves 13, 14. Via lines 11, 12 the gas entering through the inlet 2 passes either directly (line 11) or indirectly (line 12) into the mass spectrometer 4. The path for the gas is selected with the aid of valves 13, 14. If valves 8 and 13 are closed and when valve 14 is open the backing pump 9 may serve the purpose of evacuating the test sample or the test chamber (not shown), which is linked to inlet 2 before the leak search commences.

In order to ensure operation of the helium leak indicator 1 in accordance with the present invention, a component (valve 16) allowing the gas flow passing through it to be modulated is located in line 3. The cross section of the opening or the flow conductance of the valve 16 is variable. Details on modulations of this kind are basically known from DE-A-44 08 877.

A controller 21 is provided for actuating the valve 16, this valve preferably being of the proportional action type. Part of this controller is a pulse generator. The flow conductance of the valve 16 changes in correspondence with the selected shape of the pulses. The shape of the pulses is adjustable in such a manner, so that on the one hand, the desired modulation of the gas passing through the valve and on the other hand the mean opening time or the mean conductance of the valve 16, can be influenced. Design examples for this are explained with reference to drawings FIGS. 3 and 4.

Moreover, the signal supplied by the controller 21 is also supplied as the reference signal to an amplifier 23. Amplifier 23 serves the purpose of processing the signals supplied by the mass spectrometer. After amplification and phase-sensitive rectification in accordance with the LOCK-IN principle, the signal is displayed. The unit displaying the signal is represented by block 24.

The design example according to drawing FIG. 2 substantially corresponds to the design example according to drawing FIG. 1. Differences or supplements are:

The high vacuum pump 6 is a two-stage friction vacuum pump having on its high vacuum side a turbomolecular pumping stage 6' and a screw pumping stage 6" on the forevacuum side.

Located between said pumping stages is an intermediate connection 31 to which line 11 is connected.

Arranged instead of valve 13 in line 11 is valve 16.

The backing pump 9 is a diaphragm vacuum pump.

A pressure gauge 32, the signals of which are supplied to the controller 21, is provided for the purpose of driving the valve 16 during the pumpdown process and for indirect monitoring of the pressure in mass spectrometer 4.

A further pressure gauge 33, the signals of which are also supplied to controller 21, is provided to monitor the pressure in the area of the inlet 2 of the helium leak indicator 1.

Depicted in drawing FIGS. 3 and 4 are possibilities for the selection of modulations having such properties, that through their presence influence can be taken on the mean conductance of the valve 16. Drawn into each of the drawing FIGS. 3a to 3c and 4a to 4c are two horizontal lines which correspond to the valve status "open" (line 35) and "closed" (line 36).

In the case of the modulations in accordance with drawing FIGS. 3a to 3c, the pulse generator supplies a periodically varying signal of constant frequency and constant amplitude. The amplitude corresponds approximately to half of the distance between the lines 35 and 36. The position of the curves 37 which are identical in shape differs in drawing FIGS. 3a to 3c. In the case of the modulation properties according to drawing FIG. 3a, the cross section of the opening of valve 16 changes periodically between half open and fully open. In the case of the modulation properties according to drawing FIG. 3c, the cross section of the opening changes periodically between closed and half open. In the case of the modulation properties according to drawing FIG. 3b, the cross section of the opening of valve 16 changes periodically between approximately one quarter open and three quarters open. It is apparent that in the states as depicted in drawing FIGS. 3a and 3c the mean cross section (averaged over time) of valve 16 differs. In the case of the modulation according to drawing FIG. 3a the mean cross section is relatively wide so that the effective pumping capacity of the vacuum pump (s) is relatively high. From this there results a relatively low sensitivity for the leak searching process. By modifying the modulation properties in accordance with drawing FIG. 3b (moderate pumping capacity) and 3c (low pumping capacity) the sensitivity of the leak searching process is increased. In the case of the modulation properties corresponding to the curves 38, 39, 40 depicted in drawing FIGS. 4a to 4c, the cross section of the opening of valve 16 changes continuously between open and closed. In the case of the modulation according to drawing FIG. 4b, the modulation is periodic so that a moderate pumping capacity and thus a moderate sensitivity results. In the case of the modulation according to drawing FIG. 4a, the oscillations in the "open" direction are longer compared to the oscillations in the "closed" direction. The mean time during which the valve 16 is open, and thus the pumping capacity is relatively high, sensitivity is low. In the case of the modulation according to drawing FIG. 4c, the timing characteristic is reversed, this means that the mean time during which the valve is open is relatively short and thus the pumping capacity is low, the sensitivity of the leak search using these modulation properties is high.

Depicted in drawing FIGS. 3 and 4 are only two types of pluses of many through which the desired targets may be attained. It is important that the modulation properties be selected through electronic means, so that on the one hand the inflowing gas which is to be analysed with respect to the test gas is modulated, and that on the other hand the mean cross section of the opening of valve 16 be variable infinitely or in steps (and thus the pumping capacity of the vacuum pumps effective at the inlet). In order to operate a helium leak indicator of the kind according to the present invention, a calibration curve is determined. It gives the relative sensitivity as a function of effective pumping capacity. The calibration curve is employed for establishing the correct measurement signal. This is necessary, since at a certain leak rate there result differing measured values which depend on the modulation properties.

For implementing a leak detection method with a leak indicator according to drawing FIG. 1, the test sample which is to be inspected for the presence of leaks is first connected at inlet 2, and then evacuated by the backing pump 9 with valves 14 and 16 open and with valves 8, 13 closed. In a manner which is basically known, this may be followed by the detection of gross leaks which becomes possible as soon as the pressure has reached such a value that the valve 8 may be opened. If the test sample does not exhibit a gross leak, valve 14 is closed, valve 13 is opened and the inflowing gas is modulated with the aid of valve 16. The modulation properties are selected either once so that they correspond to the desired sensitivity. Immediately after valves 13, 14 have been switched over, the leak search then commences at the given sensitivity.

An other possibility exists by continuously increasing the sensitivity of the leak search with increasing measurement time. This is performed by initially selecting the modulation properties in such a manner that a high pumping capacity and a low sensitivity are employed. Thereafter the modulation properties are varied infinitely, for example, in such a manner that a transition is performed from a relatively high pumping capacity with low sensitivity, to a low pumping capacity and with a high sensitivity. If at some time between gross leak detection, fine leak detection with low sensitivity and fine leak detection with high sensitivity, the presence of the test gas is recorded, then the test sample has a leak. The leak search is interrupted. The searching process for the leak has taken place within an optimally short period of time.

In case the gas flow passing through the valve 16 exhibits a helium background, the signal supplied by the mass spectrometer 4 may be employed as the manipulated variable for infinitely varying the modulation properties. In the case of a leak-tight test sample, the signals provided by the mass spectrometer 4 correspond to the helium background in the gas flow to be analysed. With increasing measurement time the magnitude of the signals decreases. As long as the signal does not drop below a given signal level, the modulation properties are not changed so that an initially high effective pumping capacity is maintained. Only after the signal has dropped below a given level, are the modulation properties changed in such a manner that the effective pumping capacity is reduced thereby increasing sensitivity. In the case of a leak-tight test sample, the leak search is terminated after the desired sensitivity has been attained. If in the course of the leak searching process it is determined that the test sample has a leak, this leak search is always performed within an optimally short time.

In the design example according to drawing FIG. 2, the valve 16 is located in the line 11 which is linked to intermediate connection 31. This arrangement allows for early throttled opening of valve 16 in order to support, with the aid of the screw pump 6" the relatively weak pumping capacity of the diaphragm pump 9 at the ultimate pressure level. Moreover, the line 3 does not contain the valve 16 so that the valve will not impair the evacuation of the test sample via line 3 at the beginning of the leak search.

A pressure gauge 32 is connected to line 7. It delivers its measurement signals to the controller 21 which controls the valve 16 among others. Thus too early or too wide opening of valve 16 may be prevented, which would cause the pressure in the mass spectrometer to rise above its operating pressure. A pressure gauge fulfilling the same purpose may also be connected to intermediate connection 31.

The pressure in the area of inlet 2 of the helium leak indicator 1 is also monitored by the controller 21. The pressure gauge 33 arranged at this point supplies its signals to the controller 21. The inlet pressure must not rise above a certain threshold. This could happen, if the pumping capacity were reduced too quickly with the aid of valve 16 for the purpose of increasing the sensitivity.

What is claimed is:

1. A method of operating a helium leak indicator that contains a helium detector which is connected to a high vacuum pump and a backing pump for evacuating the detector and an adjustable valve that is arranged to modulate the flow of a test gas to be analyzed through the detector, said method including the steps of applying a modulated input signal to said valve, modulating the input signal to the valve to adjust the level of flow conductance of said valve so that the effective pumping capacity of the leak indicator is modified at the inlet to the leak indicator, modulating the input signal prior to performing a leak test to adjust the sensitivity of the leak indicator, and further modulating the input signal to adjust the sensitivity of the leak indicator as a test is being conducted.

2. The method of claim 1 wherein said detector is a mass spectrometer and further including the step of employing a modulation signal from the mass spectrometer to adjust the modulation characteristic of the input signal, the magnitude of the modulation signal being dependent upon the helium background in the sample gas flow.

3. The method of claim 2 that includes the further steps of initially adjusting the sensitivity of the leak indicator to a given level, maintaining said sensitivity at said given level as long as the magnitude of the modulation signal remains at said given level, and increasing said sensitivity when the magnitude of the modulation signal drops below said given level.

4. The method of claim 3 that includes the further step of adjusting the characteristics of the modulation signal so that the magnitude of the modulation signal remains at a constant level.

5. The method of claim 1 that includes the further step of monitoring the pressure in said detector.

6. The method of claim 1 that includes the further step of monitoring the pressure at a sample gas inlet to the leak indicator while a test is being conducted.

7. A helium leak indicator system that includes:
   a helium leak detector,
   a high vacuum pump connected to a backing pump for evacuating said system,
   an output signal drive means that operates to cause a modulation of gas flow at a test sample input to said system,
   an electrically driven proportional action control valve mounted in the test sample inlet to the system that is responsive to a modulated input signal from said signal drive means to adjust the flow of a sample gas through the system, and control means for varying the modulation of the input signal to adjust the flow conductance of said control valve and change the pumping capacity at the inlet of the system.

8. The system of claim 7 wherein the detector and the control means are connected together.

9. The system of claim 7 that further includes a first pressure gage for monitoring the pressure in the detector.

10. The system of claim 7 that further includes a second pressure gage for monitoring the pressure at the inlet to the system.

11. The system of claim 7 wherein said high vacuum pump further includes a turbomolecular pumping stage and a screw pumping stage and said backing pump is a diaphragm pump and wherein said control valve is connected into an intermediate connection between the two high vacuum stages.

12. A method of operating a helium leak indicator that contains a helium detector which is connected to a high vacuum pump and a backing pump for evacuating the leak indicator and an electrically driven adjustable control valve that is arranged to modulate the flow of a test gas at a test gas input to the leak indicator, said method including the steps of:
   generating a modulating input signal for causing a modulation in the flow of said test gas at the input to the leak indicator,
   applying the modulating input signal to said electrically driven control valve to control the flow conductance of a test gas through said leak indicator, and
   automatically varying the modulating input signal to change the flow conductance through said valve to produce a corresponding change in the leak indicator's sensitivity.

13. The method of claim 12, wherein said leak detector is a mass spectrometer and includes the further step of generating the modulating input signal in response to an output signal from said mass spectrometer.

14. The method of claim 13, wherein the further step of employing the output signal from the mass spectrometer as a manipulated variable for automatically adjusting the modulating input signal depending upon the helium background in the test gas detected by said mass spectrometer.

15. The method of claim 14 wherein the modulating input signal remains unchanged until such time as the output signal provided by the mass spectrometer drops below a given threshold level whereby the modulating input signal is adjusted to increase the sensitivity of the leak indicator.

* * * * *